(12) United States Patent
Charbonnier et al.

(10) Patent No.: US 10,038,681 B2
(45) Date of Patent: Jul. 31, 2018

(54) METHOD FOR MANAGING AN ACCESS FROM A REMOTE DEVICE TO DATA ACCESSIBLE FROM A LOCAL DEVICE AND CORRESPONDING SYSTEM

(75) Inventors: Emilien Charbonnier, La Cadiere d'Azur (FR); Antoine Galland, Gemenos (FR); Patrick George, La Ciotat (FR)

(73) Assignee: GEMALTO SA, Meudon (FR)

( * ) Notice: Subject to any disclaimer, the term of this patent is extended or adjusted under 35 U.S.C. 154(b) by 1447 days.

(21) Appl. No.: 13/002,852

(22) PCT Filed: Jul. 7, 2009

(86) PCT No.: PCT/EP2009/058637
§ 371 (c)(1),
(2), (4) Date: Mar. 8, 2011

(87) PCT Pub. No.: WO2010/003967
PCT Pub. Date: Jan. 14, 2010

(65) Prior Publication Data
US 2011/0154462 A1    Jun. 23, 2011

(30) Foreign Application Priority Data
Jul. 8, 2008    (EP) ..................................... 08300234

(51) Int. Cl.
*G06F 21/00* (2013.01)
*H04L 29/06* (2006.01)
(Continued)

(52) U.S. Cl.
CPC .............. *H04L 63/08* (2013.01); *H04L 67/02* (2013.01); *H04L 29/12924* (2013.01); *H04L 61/6063* (2013.01)

(58) Field of Classification Search
CPC ... H04L 63/08; H04L 67/02; H04L 29/12924; H04L 61/6063
(Continued)

(56) References Cited

U.S. PATENT DOCUMENTS 5,987,506 A * 11/1999 Carter et al. .................. 709/213
6,115,741 A *  9/2000 Domenikos et al. .......... 709/217
(Continued)

OTHER PUBLICATIONS

Web Remote Access. [online]. 2Wire, Inc., 2005 [retrieved on Feb. 9, 2013]. Retrieved from the Internet: <http://www.att.com/support_media/images/pdf/8060/SBC_Web_Remote_Access.pdf>.*
(Continued)

*Primary Examiner* — Lisa C Lewis
(74) *Attorney, Agent, or Firm* — Buchanan Ingersoll & Rooney PC

(57) ABSTRACT

The invention relates to a method for managing an access from a remote device to data and/or at least one resource accessible from a local device. The local device includes a browser. The remote device hosts a server, as a remote server. During a remote server connecting step, the browser sends to the remote server a request for loading data. According to the invention, the remote server sends, through the browser, to a local server a request for connecting a local server, as response to the request for loading data, and the local server sends data to the remote server, the local server being connected from the remote server to a data storage devices and/or at least one resource accessible from the local device. The invention relates also to a corresponding system having a token and a terminal coupled with the token.

14 Claims, 4 Drawing Sheets

(51) Int. Cl.
*H04L 29/08* (2006.01)
*H04L 29/12* (2006.01)

(58) Field of Classification Search
USPC .................................. 709/213–216; 711/147
See application file for complete search history.

(56) References Cited

U.S. PATENT DOCUMENTS

| | | | | |
|---|---|---|---|---|
| 6,167,453 | A * | 12/2000 | Becker et al. | 709/245 |
| 6,615,244 | B1 * | 9/2003 | Singhal | 709/213 |
| 6,754,696 | B1 * | 6/2004 | Kamath et al. | 709/213 |
| 6,842,770 | B1 * | 1/2005 | Serlet et al. | 709/203 |
| 7,058,696 | B1 * | 6/2006 | Phillips et al. | 709/217 |
| 7,124,305 | B2 * | 10/2006 | Margolus et al. | 713/193 |
| 7,139,809 | B2 * | 11/2006 | Husain et al. | 709/213 |
| 7,171,472 | B2 * | 1/2007 | O'Brien et al. | 709/226 |
| 7,174,433 | B2 * | 2/2007 | Kottomtharayil et al. | 711/147 |
| 7,567,987 | B2 * | 7/2009 | Shappell et al. | |
| 7,587,467 | B2 * | 9/2009 | Hesselink et al. | 709/214 |
| 7,624,170 | B2 * | 11/2009 | Das et al. | 709/223 |
| 7,644,433 | B2 * | 1/2010 | Mizrah | 726/2 |
| 7,809,366 | B2 * | 10/2010 | Rao et al. | 455/419 |
| 8,126,990 | B2 * | 2/2012 | Fiducci | 709/220 |
| 2002/0087653 | A1 * | 7/2002 | Duroj | 709/213 |
| 2002/0133561 | A1 * | 9/2002 | O'Brien et al. | 709/213 |
| 2004/0128347 | A1 * | 7/2004 | Mason et al. | 709/203 |
| 2005/0144186 | A1 * | 6/2005 | Hesselink et al. | 707/101 |
| 2005/0278422 | A1 * | 12/2005 | Prust | 709/203 |
| 2006/0075196 | A1 * | 4/2006 | Kobayashi et al. | 711/147 |
| 2006/0236325 | A1 * | 10/2006 | Rao et al. | 719/315 |
| 2006/0242273 | A1 * | 10/2006 | Fiducci | 709/220 |
| 2010/0138514 | A1 * | 6/2010 | Charbonnier | 709/216 |

OTHER PUBLICATIONS

Microsoft computer dictionary, 5$^{th}$ edition, Mar. 22, 2002, Microsoft Press, p. 596.*
International Search Report (PCT/ISA/210) dated Aug. 14, 2009, by European Patent Office as the International Searching Authority for International Application No. PCT/EP2009/058637.
Search Report dated Jan. 15, 2009, by European Patent Office for Application No. 08300234.

* cited by examiner

METHOD FOR MANAGING AN ACCESS FROM A REMOTE DEVICE TO DATA ACCESSIBLE FROM A LOCAL DEVICE AND CORRESPONDING SYSTEM

FIELD OF THE INVENTION

The invention relates, in a general manner, to a method for managing an access from a remote device to data and/or at least one resource accessible from a local device.

Moreover, the invention relates to a system for managing an access from a remote device to data and/or at least one resource accessible from a local device.

More particularly, the present invention applies to a system including a personal computer (or PC), as a local device, and remote device connected to the local device.

STATE OF THE ART

The local device and the remote device are typically connected over a communication network, such as an Internet network or an Intranet network. The remote device hosts a server, termed, within the present description, a remote server.

As known per se, a PC user accesses the remote server by using one user interface, such as a (web) browser. Furthermore, the PC user accesses data stored locally, i.e. within the PC, or any hardware means connected to the PC, by using another user interface.

However, the local device user needs to use two different user interfaces, so as to access data stored within different storage areas. More exactly, one user interface is used for a remote access to data stored within a remote device, and another user interface is used for a local access to data and any local resource accessible from the local device.

Consequently, the local device user has to toggle between the two user interfaces, so as to perform some operations of cross-connection between the different data storage areas while being unable to perform some cross-connection operations.

A first known solution proposes to configure, in a complex manner, a (web) browser, so as to be able to perform some cross-connection operations between the different data storage areas.

Nevertheless, a "normal user" is not able to perform such a complex configuration that requires to be rather an "experience user".

A second known solution proposes to install a dedicated software component on the local device of the user, so as to be able to perform some cross-connection operations between the different data storage areas.

However, such known solutions have a major disadvantage.

As a matter of fact, some cross-connection operations are not possible. In particular, since the remote server does not access to data locally stored and/or any resource connected to the local device, a transfer of data from a local data storage area to a remote data storage area and a transfer of data from a remote data storage area to a local data storage are impossible.

SUMMARY OF THE INVENTION

The invention eliminates such a major disadvantage by providing a method for managing an access from a remote device to data and/or at least one resource accessible from a local device. The local device comprises a browser. The remote device hosts a server, as a remote server. The method comprises a remote server connecting step in which the browser sends to the remote server a request for loading data.

According to the invention, the method comprises, as steps, a local server interconnecting step in which the remote server sends, through the browser, to a local server a request for connecting a local server, as response to the request for loading data; and a local server connecting step in which the local server sends data to the remote server, the local server being connected from the remote server to data storing means and/or at least one resource accessible from the local device.

The principle of the invention consists in addressing, through a (web) browser, a local server that interfaces between the remote server and the local data and/or hardware accessible from the local device.

The local server acts as a router between a local resource and the remote server.

The local server is able to transfer data from the remote server to any resource comprised within the local device and/or any resource connected to the local device.

The local server is able to transfer from any resource comprised within the local device and/or any resource connected to the local device to the remote server.

Thus, the remote server has to be connected to the local server, in order to exchange data with the local device resources or its peripheral resources.

The local server is therefore involved to let an access from the remote server to data stored locally or any resource connected to the local device. Likewise, the local server is also involved to access the remote server itself or through the remote server to another remote server to which the remote server allows an access.

The proposed solution allows therefore cross-connection operations for a user between the remote server and the involved local server.

Due to the fact that the remote server has to exchange with the local server, as an intermediary with any data stored locally or any hardware locally accessible, there is no need for a local device user to configure in a complex manner the browser. Moreover, there is either no need to install a dedicated software component on the local device.

A user addresses a unique user interface, namely a browser, to access data that are locally stored and data that are remotely stored, as well as to perform cross-connection operations between the local resource and the remote resource.

According to a further aspect, the invention is a system for managing an access from a remote device to data and/or at least one resource accessible from a local device. The system comprises a local device and a remote device connected to the local device. The remote device hosts a server, as a remote server. The local device comprises a browser comprising means for sending to the remote server a request for loading data.

According to the invention, the local device comprises a local server; the remote server comprises means for sending, through the browser, to the local server a request for connecting a local server, as response to the request for loading data; the local server comprises means for sending data to the remote server, and the local server being configured so as to be connected from the remote server to data storing means and/or at least one resource accessible from the local device.

As local device, it can be, for example, a terminal, a desktop computer, a laptop computer, a handset, a mobile telephone, and/or a Personal Digital Assistant (or PDA).

BRIEF DESCRIPTION OF THE DRAWINGS

Additional features and advantages of the invention will be more clearly understandable after reading a detailed description of two preferred embodiments of the invention, given as indicative and not limitative examples, in conjunction with the following drawings.

DETAILED DESCRIPTION OF ONE EMBODIMENT

Herein under is considered a case in which the invention method for managing an access from a remote device is implemented by a host computer, as a remote device embedding at least one server, to data and several peripheral devices accessible from a PC, as a local device.

However, it is only for exemplifying purposes and is not considered to reduce the scope of the present invention.

For example, instead of embedding at least one server, the remote device is connected to at least an external (remote) server. In such an example, the remote device becomes an intermediary entity between the exterior and the external server.

Figure 1:
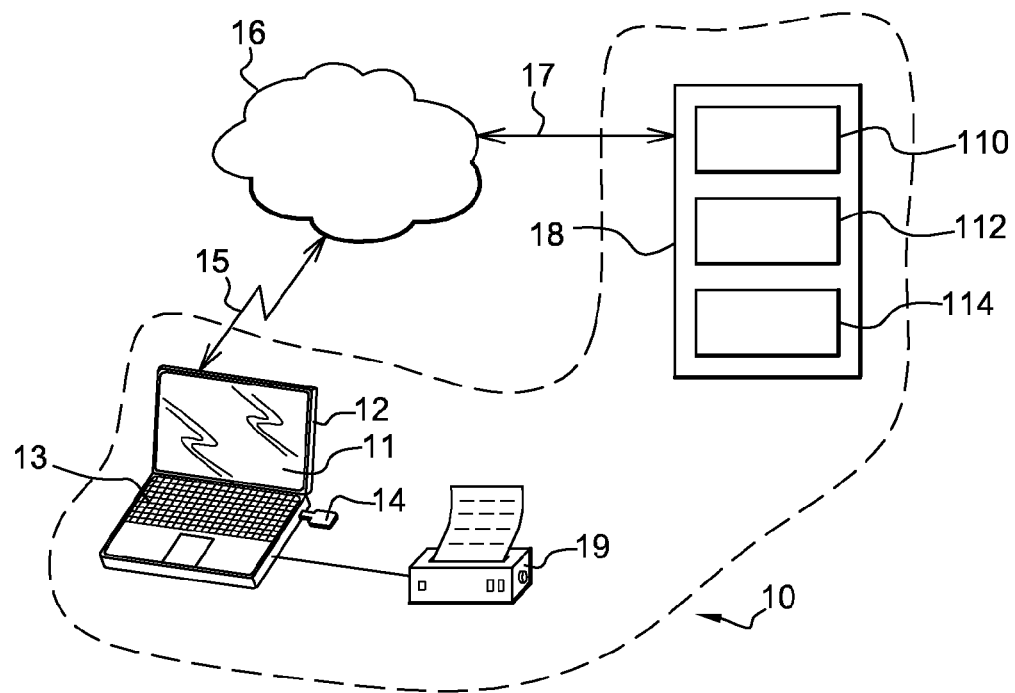
FIG. 1 illustrates a simplified diagram of an embodiment of an electronic system comprising a PC, as a local device, and a remote device hosting a remote server, and being adapted to involve, through a browser, a local server between the remote server and data and/or any resource locally accessible according to the invention.

FIG. 1 shows an electronic system 10 comprising a PC 12, as a local device, connected to at least one remote computer 18, as a remote device.

According to other embodiments, the local device is any terminal to which one or several devices can be connected, like a laptop computer, a handset, a mobile telephone, and/or a PDA.

As known per se (not represented), the PC 12 comprises, among others, one microprocessor, as data controlling and processing means, one hard disk, as mass-storage memory to store data relating to an Operating System, several applications including a (web) browser, and PC user data.

The PC 12 includes, as a man machine interface, a display screen 11 for displaying information to a PC user, and a keyboard 13 used by the PC user notably for entering and/or selecting data.

The PC 12 is connected, via a wireless link 15, like a Bluetooth (registered trademark) or a Wifi (registered trademark) link, to a communication network 16, such as Internet.

According to another embodiment, the PC 12 is linked through a wire link to Internet.

According to a variant, the local device is connected, through two communication networks, namely a mobile radio-telecommunication network, such a GSM (acronym for "Global System for Mobile"), and an Internet network, to the remote computer 18.

The PC 12 cooperates with a token.

Within the present description, a token is an electronic portable smart object that includes means for processing and controlling data, such as at least one microprocessor.

As token, it can be any electronic portable device comprising at least one microprocessor, at least one memory or being intended to be connected to one memory, and an Input/Output communication interface.

For example, it can be any form factor, a dongle of the USB (acronym for "Universal Serial Bus") type (that does not need any specific reader within a host computer), a smart card, a MMC (acronym for "MultiMediaCard") card, or a SD (acronym for "Secure Digital") Card, or any other electronic support that may have different form factors. According to another example, the token can also be a chip fixed, in a removable manner, to a host computer, or a chip to be soldered within a host computer.

A USB Flash Drive or UFD 14, as token, is coupled to the PC 12, as host and local device.

The UFD 14 is connected, through a USB connector, to a USB port of the PC 12.

According to a variant, the token is connected to the host device, through a wireless link, like a Bluetooth or a Wifi link.

The UFD 14 represents a peripheral device with respect to the PC 12, as its host computer.

Figure 2:
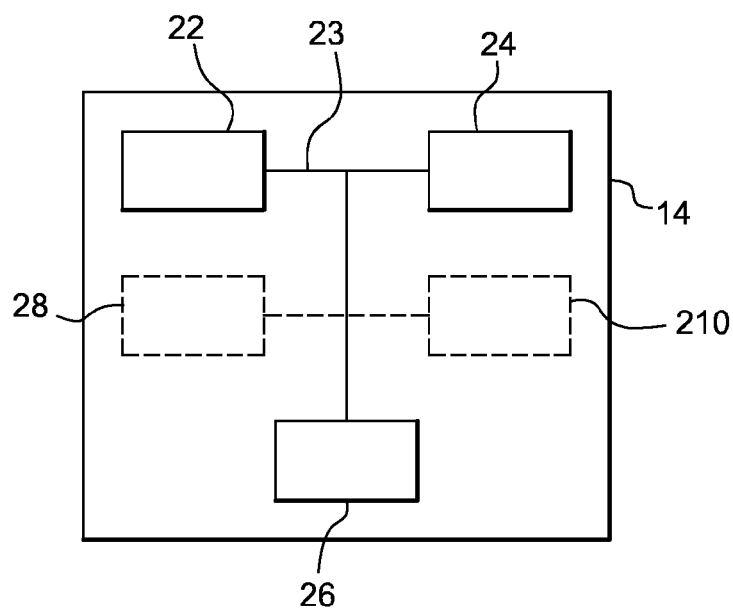
FIG. 2 illustrates a simplified diagram of an embodiment of a USB Flash drive, as token, to be connected to the PC of FIG. 1.

The UFD 14 is described more in details in relation with FIG. 2.

The UFD 14 stores, within a client agent, a software component constituted by a local web server (not represented) termed, for simplicity, hereinafter local server.

Once connected, the UFD 14 is preferably configured to install and let run the local server on the PC 12.

The UFD 14 can store one or several additional software components, like one or several plug-ins, to be installed on the PC 12. The plug-ins interact with the web browser, as a host application, to provide one or several specific functions "on-demand", in order to create capabilities to extend the web browser. For example, the capabilities are rights for reading and/or writing a file(s), in order to transfer one or several files that can be edited with the installed plug-in.

The UFD 14 may also run the local server on its own, i.e. on the UFD 14.

The remote computer 18 is preferably connected to Internet 16 over a wire link 17.

The remote computer 18 can be connected to Internet 16 over a wireless link.

The remote computer 18 hosts a remote web server 110 termed, for simplicity, the remote server 110, a remote authentication server 112 and a remote (data) storage area 114.

Instead of also hosting the remote authentication server and the remote storage area, the remote computer 18 can be connected to one or two other remote computers hosting the remote authentication server and the remote storage area.

The remote server 110, the remote authentication server 112 and/or the remote storage area 114 can be merged and thus constitute one and the same server.

The remote server 110, the remote authentication server 112 and the remote storage area 114 can access data relating to a remote computer domain. The remote computer domain includes all the data and resources that are accessed and controlled by or through the remote server 110. Such a remote computer domain is considered as being a trusted domain. Among the data that is controlled, there is data relating to encryption and/or decryption, also termed credentials that are used to exchange data between the local server, the remote server 110, the remote authentication server 112 and/or the remote storage area 114.

The remote authentication server 112 is dedicated to generate authentication data or credentials to be used for an authentication of the local server before the remote server 110 and/or the remote storage area 114. Thus, the remote authentication server 112 ensures that no other server than the local server is allowed to communicate with the remote server 110 or the remote storage area 114.

The remote storage area 114 can be used as an online remote data storage area.

The remote storage area 114 can be used as a back-up of data already stored within the PC 12 or within any hardware resource connected to the PC 12, like the UFD 14.

The remote computer 18 can be connected to one or several other remote computers (not represented) that include corresponding remote storage areas.

According to a variant, instead of hosting the remote storage area 114, the remote computer 18 is connected to another remote computer (not represented) which incorporates a remote storage area.

To access the remote web server 110, the (web) browser runs and the PC user either types an Internet Protocol (or IP) address relating to the remote server 110 or selects its IP address within a predefined list, in order to send a request for loading data relating to a home page to be downloaded from the remote server 110.

According to the invention, when the remote server 110 responses to the request for loading data relating to a web page, the remote server 110 incorporates other data to be executed by the browser in order to address a local server to be involved, in order to exchange with the remote server 110.

According to a preferred embodiment, the UFD 14 is adapted to associate the local server and the remote web server 110 to be interconnected.

According to a variant, instead of being provided by a token, the local server is previously downloaded from a predetermined remote server, like the remote server 110, to the PC 12.

The local server is preferably configured to be addressed by at least one remote server 110 that is predetermined.

The local server has a predetermined IP address that identifies it, in a unique manner.

For example, the IP address of the local server is the following "127.0.0.1:3516", in which a first part, namely "127.0.0.1", is used to access the PC 12, as its IP address, and a second part, namely ":3516", is used to address a particular port dedicated to the local server. This IP address can be defined by an organization, such as the Internet Assigned Numbers Authority (or IANA).

The local server is an application with user rights. The local server therefore accesses local file systems, namely data and/or resource(s) locally accessible, i.e. from the PC 12.

The local server ensures the cross-connection between outside and the resource(s) that is(are) locally accessible.

Thanks to the invention, the local server interfaces to access from the remote server 110 to data stored within local data storage areas and the peripheral hardware devices locally accessible. The local server therefore becomes a mandatory interlocutory from the remote server 110.

Then, the local server transfers data to the remote server 110.

Once interconnected, the local server and the remote server 110 can communicate to upload data (i.e. from the local server to the remote server 110 or a server connected to the remote server) and/or download data (i.e. from the remote server 110 or a server connected to the remote server to the local server).

The local server allows to access, in a controlled manner, from the remote server 110, the local data storage area(s) and resources accessible from the local device.

The local server preferably allows to access, in a controlled and secured manner, from the remote server 110, to the local data storage area(s) and resources accessible from the local device.

The local server allows to process data stored within local data storage area(s) and data stored within remote data storage area(s).

The local server is preferably so configured so as to be connected from the remote server 110 to data and one or several resources accessible from the PC 12. As resources accessible from the PC 12, it is in particular any peripheral device connected to the PC 12.

According to another embodiment, the local server is configured so as to be connected from the remote server only to data stored within the memory(ies) of the PC, namely its hard disk.

According to another embodiment, the local server is configured so as to be connected from the remote server only to a selection of peripheral devices connected to the PC 12, for example only the UFD 14, as one peripheral device.

According to a variant, the local server is configured so as to be connected from the remote server 110 to data and a selection of resources accessible from the PC 12.

As peripheral devices, besides the UFD 14, a printer 19 is connected to the PC 12.

Other peripheral devices can be also connected to the PC 12, in order to expand the capabilities of the PC 12. As peripheral devices, among others, it can be a scanner, an external disk drive, a tape drive, a microphone, a speaker, a camera, an external computer, and/or a card reader.

All the peripheral devices are controlled from the PC 12 through the local server.

The remote server 110 contains one or several web pages.

A web page is a document written in a language such as a HyperText Markup Language or HTML.

The web page is accessed via a HyperText Transfer Protocol (or "HTTP") using a schema based upon request/ response messages, between a client (initiating a request message sent to the server) and a server (responding to the client with a response message).

To access the web page, the PC user runs the web browser and either types a Web address (or termed "Uniform Resource Locator") associated with the web page (also termed home page) of the remote web server 110 or selects the Web address associated with the remote server 110.

According to one aspect of the invention, the remote server 110 is adapted to send, through the browser, to the local server, as response to the request for loading data, a request for connecting the local server, to interconnect the remote server 110 and the local server.

The PC user sees, at the display screen 11, through the (web) browser, the desired web page transferred from the remote web server 110.

To interconnect the remote server 110 and the local server, the remote server 110 addresses to the browser, within the downloaded web page, an interconnecting message, as response to the request for loading data.

The downloaded web page transports executable data that is meant for the local server while using the predetermined IP address identifying the local server.

The web browser interprets and executes executable data, such as a JavaScript included within the downloaded web page, requesting it to address the local server. As known per se, JavaScript is a scripting language that has been standardized by Ecma (stands for European Computer Manufacturers Association) International within the ECMA-262 specification.

The web browser detects the presence of the local server and addresses the local server by implementing HTTP.

The downloaded web page contains a graphic interface that aggregates data originating from local data storage(s) and from remote data storage area(s) due to the local server and the remote server respectively.

The local server and the remote server 110 dynamically cooperate with each other to allow to transfer data, in both directions between the different data storage areas, namely from local storage area(s) to remote storage area(s) and from remote storage area(s) to local storage area(s).

The invention application is constituted by the local server and the remote server 110. The invention application is therefore distributed between the PC 12, as the local computer, and the remote computer 18.

Prior to any further communication between the local server and the remote server, the remote server 110 is preferably to be authenticated by the local server.

To authenticate the remote server 110, the remote server 110 sends, through the browser, to the local server, as response to the request for loading data, data relating to its own credentials.

Prior to any further communication between the local server and the remote server, a user authentication is preferably implemented. Only a PC user desiring to connect, through the local server, to the remote server 110 that has its own credentials, is allowed to connect the remote server 110. No third party other than the authenticated PC user is allowed to connect the remote server 110.

To authenticate a user desiring to connect, through the local server, to the remote server 110, a PC user can enter, after having been prompted by a message displayed on the display screen 11 data, such as a Personal Identification Number (or PIN), as her or his credentials, by using the keyboard 13.

The message is displayed, thanks to executable data included within the downloaded web page originating from the remote server 110, for example, while using a script sent by the remote server 110 to the local server and executable by the local server, like a JavaScript, such as a "login.html".

The UFD 14 is preferably able to compare the entered data with an expected PIN stored within the UFD 14. The UFD 14 is able to authorize or forbid any further communication between the local server and the remote server 110. To inform the remote server 110 of a corresponding user authentication result, namely the user is authorized or not authorized, the UFD 14 sends, through the local server, to the remote server 110 a message comprising the corresponding user authentication result.

Instead of the UFD 14, a smart card (not represented) connected (through a contact reader) to the PC 12 is dedicated to compare the entered data with an expected PIN stored within the smart card. The smart card is able to authorize or forbid any further communication between the local server and the remote server 110. To inform the remote server 110 of a corresponding user authentication result, namely the user is authorized or not authorized, the smart card sends, through the local server, to the remote server 110 a message comprising the corresponding user authentication result. The local server and the smart card exchange, as network elements, by implementing, for example, a smart card protocol based on Application Protocol Data unit (or APDU).

The PC user that owns the UFD 14 and/or the smart card has the control for accessing (personal) data stored locally or remotely. When the PC user enters data that the smart card has to compare with the expected PIN, the PC user gives, as a voluntary action, her or his proof of consent for accessing (personal) data stored locally or remotely.

Alternatively, instead of PC user authentication, the local server and the remote server 110 can implement, or let implement, on its behalf, a mutual authentication.

To perform such a mutual authentication, the local server and the remote server 110 accesses one common Public Key Infrastructure (or PKI) for server authentication based on shared keys and a common encrypting/decrypting algorithm, like a DES (acronym for "Data Encryption Standard"), or a 3 DES, in order to exchange data in an encrypted manner.

As known per se, a PKI is a mechanism that enables different entities, as parties, to be authenticated to each other and to use the public key information to encrypt messages to each other. The PKI enables the parties in a dialogue to establish confidentiality, message integrity and user authentication without having to exchange any secret information in advance. The parties trust each other on their identities and keys.

When the PC user connects its UFD 14, the PC user gives her or his proof of consent by releasing credentials stored within the UFD 14 and accessible from the local server for its authentication before the remote server 110.

The local server accesses its own private key, called hereinafter local private key, and a public key relating to the remote server 110, called hereinafter remote public key that are stored within the UFD 14.

The UFD 14 implements the PKi by using the common encrypting algorithm and the remote public key, in order to encrypt data to be sent to the remote server 110.

The UFD 14 implements the PKi by using the common decrypting algorithm and the private local key, in order to decrypt data to be received from the remote server 110.

Likewise, the remote server 110 stores a private key relating to the remote server, called hereinafter the remote private key, a public key relating to the local server, called hereinafter the local public key, and one common encrypting/decrypting algorithm, in order to exchange data with the local server in an encrypted manner.

The remote server 110 implements the PKi by using the common encrypting algorithm and the local public key, in order to encrypt data to be sent to the local server.

The remote server 110 implements the PKi by using the common decrypting algorithm and the remote private key, in order to decrypt data to be received from the local server.

Once the remote server 110 and the local server have been interconnected and mutually authenticated, the PC user can request, through the web browser, any operation of data transfer.

The web browser, as one single user interface, aggregates data originating from different remote data storage areas, and data originating from different local data storage areas.

More precisely, the web browser presents information relating to, on the one hand, data stored within the remote server 110, within the remote authentication server 112 and within the remote storage area 114, and, on the other hand, data stored within the PC hard disk, data stored within the UFD 14, data relating to the printer 19.

The web browser allows the PC user to manage access from the remote server 110 to data and resource(s) that are present within the PC 12 or connected to the PC 12, as well as access from the local server to data and resource that are stored within or accessible to the remote server 110.

The local server and the local data storages, as local resources, namely the hard disk and the UFD 14, can exchange by using a file system.

As known per se, a file system is a method for storing and organizing (data) files and the data that the files contain to make it easy to retrieve and access the data.

In particular, the PC user can request to transfer data stored within the hard disk, as PC memories, or stored within the UFD 14, to the remote computer 18 or other remote computer connected to the remote computer 18 (not represented).

More precisely, the PC user can select several files stored locally, for example, within the UFD 14, in order to upload them to the remote data storage area 114.

To perform such an upload of selected files, a simple user operation, like "drag" selected files from one local data storage and "drop" the selected files to one remote local data storage, is required.

The PC user is able to access, on one and the same web page that can be seen through the web browser, data accessible from the remote server 110 and data accessible from the local server.

The PC user can request to access the printer 19, for example, to print a document comprising a page that presents all data that is locally and/or remotely stored with its storing location.

Once the PC user has performed the operation(s) she or he desires, the UFD 14 can be unplugged while removing, from the PC 12, on the one hand, traces of data relating to the performed operation(s), and, on the other hand, the data and/or peripheral resource(s) that is(are) locally accessible.

FIG. 2 schematically shows components incorporated within, as token, the UFD 14 intended to be connected to a host computer, as a local device.

According to one important aspect, the UFD 14 is suited to associate a local server and an external server, as a remote server, to be interconnected. The UFD 14 is suited to configure the local server so as to be connected, through a browser, from the remote server to data storing means and/or at least one resource accessible from the local device.

In other words, the token allows to pair, through a browser, a local server with an external server, so that a device hosting the token, as the local device, is set to connect the external server to the local server, as an interlocutor of the external server.

Accordingly, contrary to the first and second aforementioned known solutions, the local device user has not any operation to perform to involve the local server, as the interlocutor of the remote server, for an access from outside to data stored within the local device and/or any resource accessible from the local device.

The proposed solution is convenient for the user and therefore user-friendly.

The UFD 14 comprises data controlling and processing means 22, such as one microprocessor, data storing means 24, and an Input/Output interface 26 connected together with a data and control bus 23.

The Input/Output interface 26 includes a USB connector. The USB connector is intended to be connected to a USB port connected to or provided by a host computer, such as the PC 12.

The UFD 14 can comprise, as a man machine interface, a display screen 28 for displaying information to a user and one button 210 for validating an operation. The man machine interface allows a real interaction between a UFD user and the UFD 14 itself in a connected mode or in an unconnected mode. The UFD user can use the man machine interface to perform One Time Password (or OTP) operations, in order to generate a key required to any operation, like:

an access to the data stored locally;
a transfer of data stored locally to a remote resource, such as a remote server, a remote authentication server, and/or a remote storage area;
a transfer of data stored within a remote storage area to a local resource, such as a Hard Disk, as a PC memory, and/or the UFD 14.

The UFD 14 is able to cooperate with any host computer, such as the PC 12, to operate as a local server with respect to a remote server.

The data and processing means 22, as heart of the UFD 14, processes and controls data to be exchanged within the UFD 14 and also data to be exchanged with outside the UFD 14.

The data storing means 24 preferentially includes volatile and non volatile memories. The non volatile memory can be constituted by one or several EEPROM (acronym for "Electrically Erasable Programmable Read-Only Memory"), one or several ROM (acronym for "Read Only Memory"), one or several Flash memories, and/or any other memories of different types, like one or several RAM (acronym for "Random Access Memory").

The data storing means 24 stores an Operating System for operating the UFD 14, and one or several applications.

The data storing means 24 comprises a mass-storage area for storing personal user data, such as photos, music and/or video data.

The data storing means 24 preferably comprises credentials, such as a PIN and/or keys, among which an encrypting key, a decrypting key. The credentials can be used to securely store data within the UFD 14 and/or outside the UFD 14, authenticate the user and/or the local server, sign data to be sent to outside world.

The data storing means 24 preferably stores a local server.

The data storing means 24 stores at least one identifier for each remote server that is allowed to interconnect the local server.

The data storing means 24 can store at least one function library to provide a host web browser with some extension capabilities, such as an access for reading a particular type of data file. Such an access for reading a particular type of data file allows a UFD user to edit a data file before requesting to transfer it.

The local server can be run on the UFD 14 itself.

The data storing means 24 preferably comprises at least one working memory that is accessible in particular when the local server is being executed.

The local server is preferably to be run on a host computer.

The local server is configured so that it can only be addressed by one or several predetermined remote servers that are identified and also preferably authenticated by the local server.

Furthermore, the local server is configured so that, when running, the local server accesses at least one local memory, i.e. one or several memories comprised within the host computer or connected to the host computer, and, in particular, the mass-storage area of the UFD 14.

The personal user data stored within the mass-storage area can be uploaded, at least in part, through the local server that runs, by transferring data to the remote storage area 114.

The personal user data can be downloaded, at least in part, onto the mass-storage area, from data originating from the remote storage area 114 through the local server that runs.

According to a preferred embodiment, once the microprocessor 22 has been informed that the USB connector 26 is connected to a host computer, the operating system is adapted such that the local server is automatically launched (either on the host computer or on the UFD) while configuring an access to the local server and an access from the local server to any hardware comprised or connected to the host computer.

Such an auto-run feature reduces the UFD user intervention allowing any UFD user to use it.

The data storing means 24 stores at least one application providing at least one security function, such as a secure data storage, a digital signature, a user identification, a user authentication, an on-board key generation, and/or a secure exchange for online transactions.

The invention token allows to obtain a portable electronic support that, besides a portable mass-storage area, provides a user-friendly (portable) token that interposes by itself a local server to communicate with an external server.

The token user does not need to intervene, in order to possibly install the local server and configure an interconnection between the local server and the remote server.

The token user has just to couple the token with a host computer. Then, the token user manipulates, in an instinctive manner, for example, one or several graphic elements displayed on a single user interface, namely a web browser.

The token user can perform different operations through the web browser, such as to read, write one data file stored either locally or remotely, download, or upload one or several data files.

The token user is able to transfer, through the local server, data to be stored within a remote storage area for an online remote back-up or data originating from a remote data storage to be stored on the mass-storage area of the token.

Figure 3:
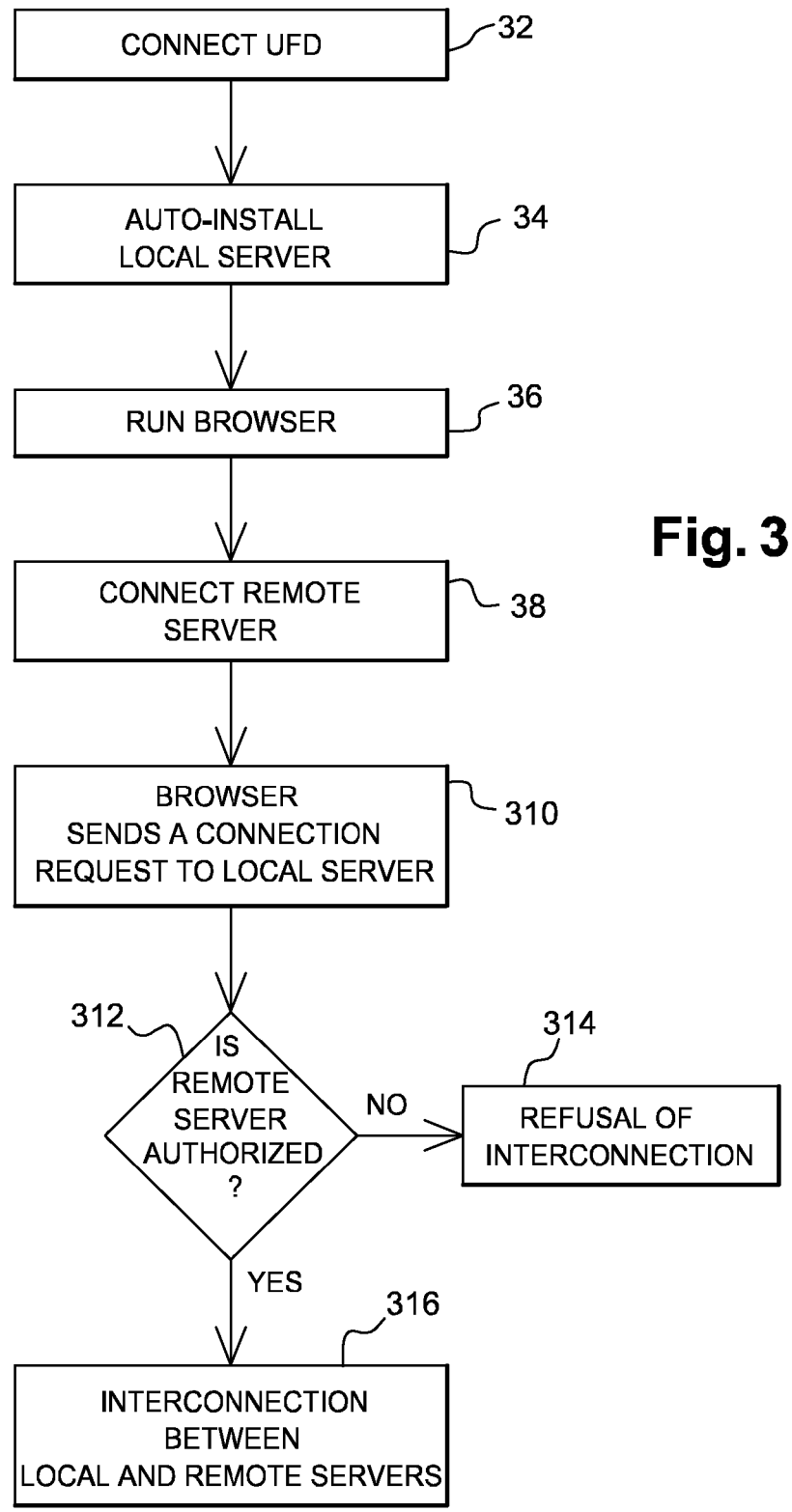
FIG. 3 is a flow chart of an exemplifying method for managing an access from the remote device to data and/or any resource locally accessible from the token of FIG. 2.

FIG. 3 depicts one example of a method for managing an access from the remote device 18 to data and/or any resource locally accessible from the UFD 14.

Firstly, an owner of the UFD 14 connects 32 the UFD to the PC 12, as the local device.

Once the UFD is connected, the UFD auto-installs 34 on the PC the local server stored on the UFD. The local server is configured so as to connect to the local resources, namely the PC memories, the UFD and any other peripheral device connected to the PC, like a printer.

A PC user launches 36 a web browser by using the PC man machine interface.

The PC user connects 38, through the web browser, to a remote server by sending a request for downloading data relating to its home page. To connect to the remote server, the PC user either types the home page address or selects the remote server name within a list of at least one predefined server name.

Then, the web browser sends 310 to the local server, a request for connecting a local server. To send the request for connecting the local server, the remote server sends, for example, by using a script, data executable by the PC web browser, downloaded within the data relating to the home page, as a response to the request for downloading data relating. The web browser interprets and executes the script by directing the request for connecting a local server to the local server installed within the PC.

The PC runs the local server that is inserted as an interlocutor.

The local server verifies 312 whether the remote server is identified as an allowed remote server to be connected to the local server. To verify whether the remote server is authorized by the local server, the local server compares the remote server identifier with an identifier of each allowed remote server comprised within an identifier list. The identifier list is stored within the UFD.

Optionally, the local server verifies at least one other conditional access is fulfilled to authorize the remote server to access the local resource(s).

According to a variant, once the local server has received, through the browser, the request for connecting the local server, the local server does not verify any conditional access, the local server sends data to the remote server. No verification step is required.

When the local server does not identify the remote server trying to interconnect with the local server, the local server refuses 314 an interconnection with the remote server.

The local server can send a message for informing the remote server that it is not allowed to access any local resources. The local server forbids any access to local resource, such as data files stored within the PC and/or the UFD.

On the contrary, i.e. when the remote server is identified by the local server, as having an authorization to connect to the local server, then the local server accepts 316 an interconnection with the remote server.

Thanks to the web browser, the local server becomes a bridge between any connected local resource and the interconnected remote server, to access either the connected local resource from the interconnected remote server or any connected remote resource from the local server.

Figure 4:
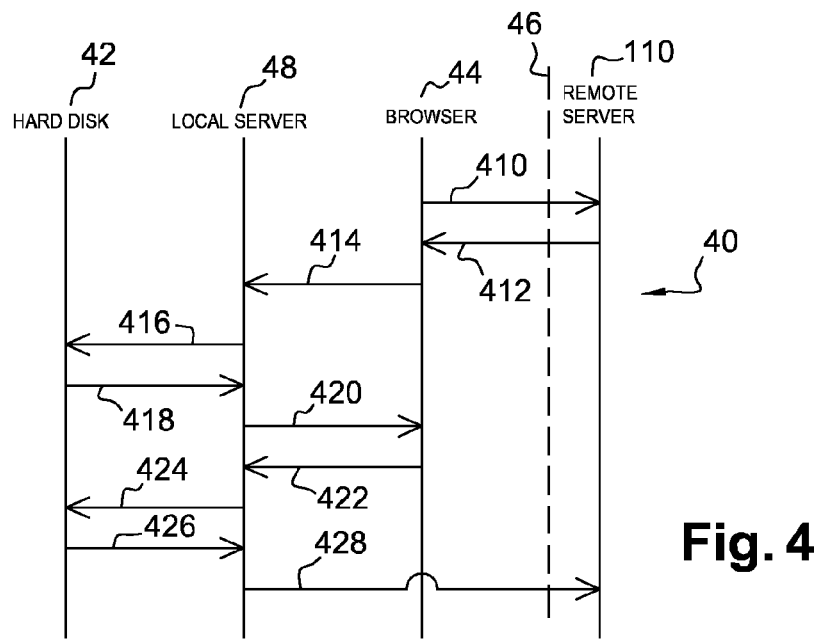
FIG. 4 depicts a first embodiment of a message flow involving the local server between the remote server and a local data storage area for a remote back-up of data locally stored, as the different entities implementing the method of FIG. 3.

FIG. 4 shows messages involving the local server between the remote server and a local data storage area for a remote back-up of data stored within the PC.

Different entities, namely a Hard Disk 42, a (web) browser 44, a remote (web) server 110 (or remote web site) and a local (web) server 48 exchange 40 data for a transfer of one selected (data) file stored within a memory of the PC, as local resource, to a remote data storage.

A vertical dotted line 46 separates the local resource(s) on the left side from the remote resource(s) on the right side.

Firstly, the browser 44 sends to the remote web site 110 a request 410, such as an HTTP GET, for downloading data relating to a home page stored remotely.

The remote site 110 receives the request and sends a response 412, to the browser 44, comprising the home page including a command for involving a local server 48 and a list of accessible remote data files preferably accompanied by credentials pertaining to the remote server.

The remote server credentials are constituted by data relating to the remote data files and that has been encrypted with an encrypting key and an encrypting algorithm shared between the remote server 110 and the local server 48.

The browser 44 shows, through the downloaded home page, the accessible remote data files.

The browser extracts from the downloaded home page the command for involving a local server 48 and addresses a request 414, such as an HTTP GET for an XML (acronym for "eXtensible Markup Language") document, to the local server identified within the command while transmitting the remote server credentials.

The local server 48 checks whether the sender identifier is known to it and whether the remote server credentials are known to it. The local server 48 decrypts encrypted data received through the browser 44 by using a decrypting key and a decrypting algorithm common to the remote server 110 and the local server 48.

When applicable, i.e. when the remote server 110 is identified and the received remote server credentials are the ones stored, then the local server 48 sends to the hard disk 42 a request 416, while using an appropriate file system command, for giving data relating to data files that are accessible.

The hard disk 42 transmits to the local server 48 a message 418 with a file list that can be uploaded, as a local file list.

The local server 48 sends to the browser 44 a message 420, such a HTTP response, for displaying the local file list stored by the hard disk 42.

Once the browser 44 has received the message 420 and interpreted the file list to be displayed, the browser 44 displays, besides the remote data files, the local file list.

A PC user, through the PC man machine interface, can request an operation through the browser 44.

The browser 44 interprets an action requested by the PC user constituted by a desire for uploading several data files, as a selection of data files of the local file list.

The browser 44 sends to the local server 48 a request 422, such as HTTP GET selected local files, specifying the local files to be copied onto the remote server 110.

The local server 48 transfers the request by sending a request 424, such as a file system command, for transmitting a copy of the selected local files to the local server 48.

Then, the local server 48 accesses to the hard disk memory through a message 426 comprising data relating to the selected local files.

Once the local server 48 receives data relating to the selected data files, the local server 48 adds its own credentials to this data, for example by encrypting it with an encrypting key and an encrypting algorithm known to both the local server 48 and the remote server 110.

Then, the local server 48 sends a HTTP message 428 including the resulting encrypted data, as local server credentials, to the remote server 110, in order to store the data sent by the hard disk 42. It is to be noted that the local server 48 transmits the HTTP message 428 to the remote server 428 in a direct manner, i.e. in a transparent manner with respect to the browser.

The remote server 110 receives the HTTP message 428 and checks the local server credentials, for example by decrypting the received data while using the common decrypting key and decrypting algorithm before storing the received data, as a back-up of the data stored within the hard disk 42.

Optionally, the remote server 110 accesses a remote (data) storage area within which the data relating to the selected data files is stored in an encrypted manner.

Figure 5:
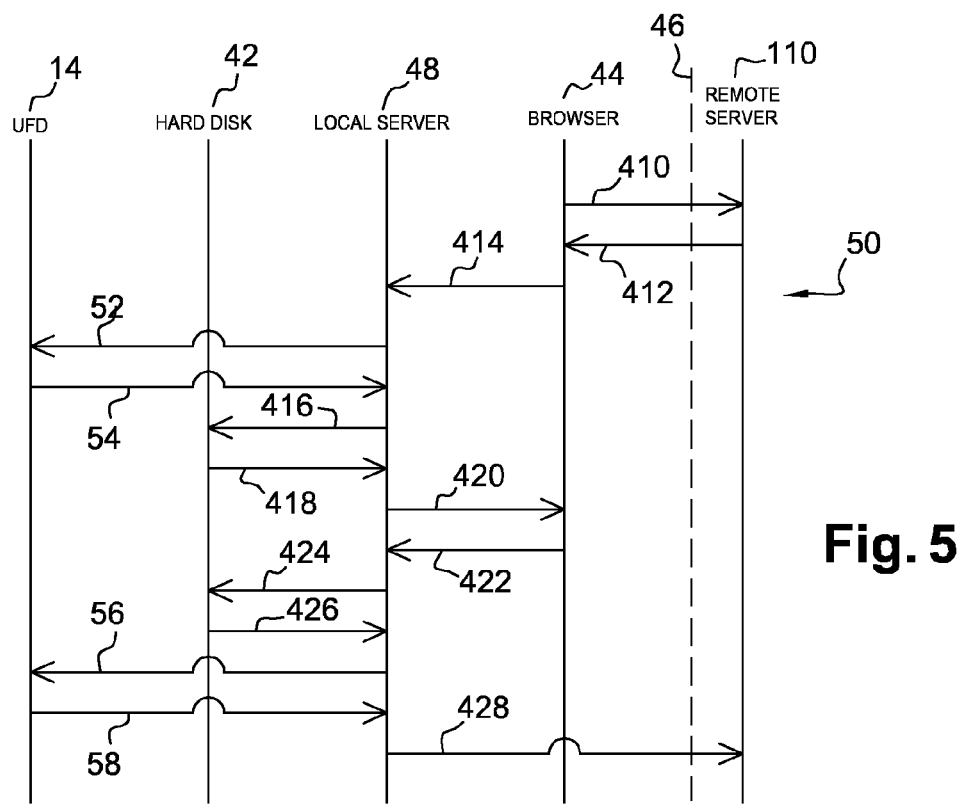
FIG. 5 depicts a second embodiment of a message flow involving the local server between the remote server and a local data storage area and the USB Flash Drive of FIG. 2 connected to the PC of FIG. 1 for authenticating a local device user, as different entities implementing the method of FIG. 3.

FIG. 5 shows messages involving the local server between the remote server and a local data storage area for a remote back-up of data stored within the PC.

Different entities, namely a Hard Disk 42, a (web) browser 44, a remote (web) server 110 (or remote web site), a local (web) server 48 and a UFD 52, exchange 50 data for a transfer of one selected (data) file stored within a memory of the PC, as local resource, to a remote data storage.

Only the differences with respect to the description of FIG. 4 are herein under explained.

Once the local server 48 has received the message 414 accompanied by the remote server credentials, instead of verifying the remote server credentials by itself, the local server 48 sends to a UFD 14 (connected to the PC) a message 52 for requesting the UFD to verify the remote server credentials.

According to a variant, the local server 48 sends to the UFD 14 a message for requesting a decrypting key and a decrypting algorithm to be used to decrypt data originating from the remote server 110. The local server 48 is supplied with information to decrypt data originating from the remote server 110.

The UFD 14 verifies whether the remote server credentials are the ones stored within the UFD 14 for a remote server that is associated.

When the remote server credentials match with the ones stored within the UFD 14, then the UFD 14 sends to the local server 48 a message 54 for informing the local server 48 that the remote server is one that is authorized to communicate with the local server 48.

Once the local server 48 has received the message 426 comprising data relating to the selected local files, instead of adding the local server credentials by itself, the local server 48 delegates it to the UFD 14. To add the local server credentials, the local server 48 sends to the UFD 14 a message 56 for requesting the UFD to add the local server credentials accompanied by data relating to the selected local files.

According to a variant, the local server 48 sends to the UFD 14 a message for requesting an encrypting key and an encrypting algorithm to be used to encrypt data relating to the selected local files to be transferred to the remote server. The local server 48 is supplied with information to encrypt data relating to the selected local files to be transferred to the remote server 110.

The UFD 14 adds the local server credentials for example by encrypting the data relating to the selected local files with an encrypting key and an encrypting algorithm known to the remote server 110.

Then, the UFD 14 sends a message 58 including the resulting encrypted data while containing local server credentials.

Figure 6:
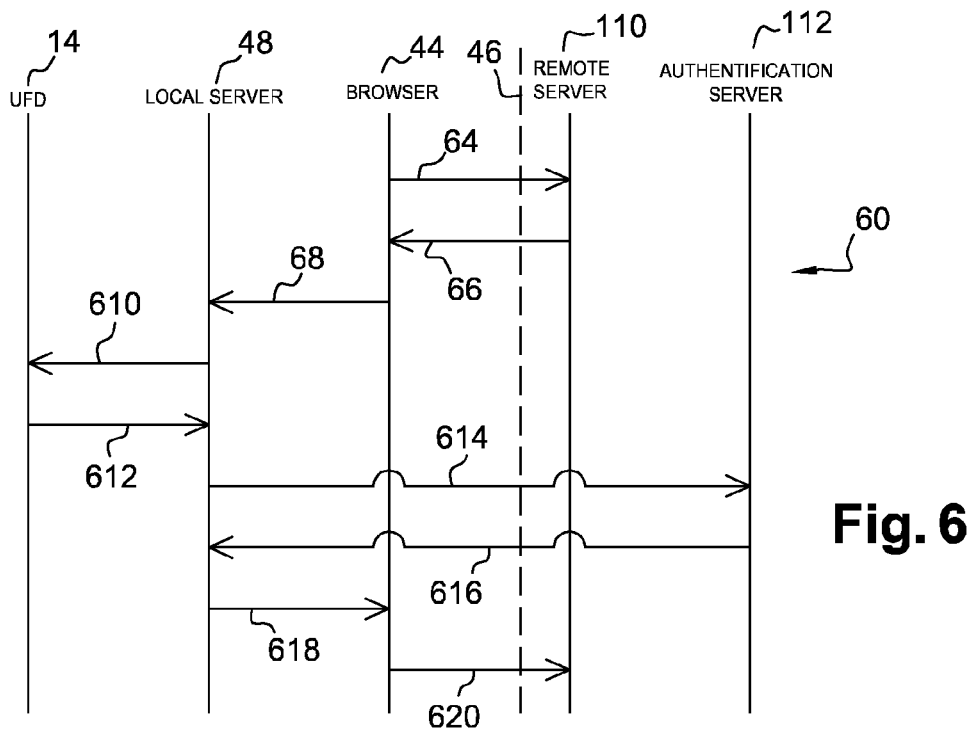
FIG. 6 depicts a third embodiment of a message flow involving the local server, the remote server, an authentication server, and the USB Flash Drive of FIG. 2 for an online authentication of the local server, as different entities implementing the method of FIG. 3.

FIG. 6 shows messages involving the local server 48, the remote server 110, an authentication server 112, and the USB Flash Drive 14 for an online authentication.

According to another embodiment (not represented), the remote server and the authentication server constitute a single server.

These different entities exchange 60 data for a transfer of a user authentication key from the authentication server 112 to the local server 48.

The online authentication is performed by the authentication server 112.

Firstly, the browser 44 sends to the remote web site 110 a request 64, such as an HTTP GET, for downloading data relating to a home page stored within the remote server 110.

The remote server 110 receives the request 64. The remote server 110 sends a response 66, to the browser 44, encompassing a command for involving a local server 48 accompanied by credentials pertaining to the remote server.

The command for involving the local server 48, such as "login.html", is a script that is executable by the browser 44. Such executable data requires the browser 44 to involve the local server 48 to authenticate itself by providing credentials relating to the UFD 14.

The remote server credentials are constituted by a first secret data that has been encrypted with a private remote server key and an encrypting algorithm stored within (or accessible by) the remote server 110.

The first secret data and the corresponding public remote server key and decrypting algorithm are stored within (or accessible by) the local server 48.

The browser 44 extracts from the encrypted data, the command for involving a local server 48.

The browser then addresses a request 68, such as an HTTP GET, to the local server identified within the command while transmitting it the encrypted data, as remote server credentials, originating from the remote server 110.

The local server 48 checks whether the sender identifier is known to it, and preferably whether the remote server credentials are known to it. The local server 48 decrypts the encrypted data received through the browser 44 by using a public remote server key and a decrypting algorithm stored within the local server 48.

When applicable, i.e. when the remote server 110 is identified and preferably the received remote server credentials are the ones stored, namely the ones that allow to retrieve the first secret data by using the corresponding public remote server key and decrypting algorithm, then the local server 48 has authenticated the remote server.

The local server 48 sends to the UFD 14 a message 610 for requesting credentials relating to a local server, as local server credentials.

The local server credentials are constituted by a second secret data that has been encrypted with a private local server key and an encrypting algorithm stored within (or accessible by) the UFD 14.

The second secret data can be identical or distinct from the first secret data.

This second secret data and the corresponding public local server key and decrypting algorithm are stored within (or accessible by) the authentication server 112.

The UFD 14 sends to the local server 48 a message 612 comprising the local server credentials.

Once this latter message 612 has been received by the local server 18, the local server 48 forwards to the authentication server 112, thanks to another message 614, the local server credentials. With this same message 614, the local server 48 requests to the authentication server, a user authentication key, as a user authentication ticket, for the current communication session.

The user authentication ticket is to be shared between the local server and the remote server 110. The user authentication ticket is used to allow to subsequently exchange further data originating from either the local data storage area(s) or the remote data storage area(s) between the local server 48 and the remote server 112. More exactly, the user authentication ticket can be used by the local server 48 to encrypt data to be sent to the remote server 110.

After the authentication server 112 has received the message 614, the authentication server 112 uses the public local server key and the decrypting algorithm, in order to decrypt and retrieve the data sent by the local server 48.

Once the data has been decrypted, the authentication server 112 checks whether the decrypted data matches with the second secret data that is stored within (or accessible by) the authentication server 112.

On the contrary, when the comparison result is negative, then authentication server 112 does not authenticate the local server 48.

In such a case, the authentication server 112 does not send to the local server 48 any further message allowing the local server 48 to continue exchanging data with the remote server 48.

When the comparison is positive, namely the decrypted data matches with the second secret data, then the authentication server 112 authenticates the local server 48.

In such a latter case, the authentication server 112 sends to the local server 48 a message 616 containing a user authentication ticket.

The authentication server 112 can revoke the user authentication ticket possibly by sending a message to the local server for informing it about a revocation relating to the user authentication ticket.

Once supplied with the user authentication ticket, the local server 48 sends to the browser 44 a message 618 including the user authentication ticket. The message 618 is intended for the remote server 110.

The browser 44 receives the user authentication ticket.

Then the browser 44 forwards to the remote server 110, thanks to another message 620, the user authentication ticket.

According to a variant, instead of transmitting the user authentication ticket through the browser 44 to the remote server 110, the local server 48 sends, in a direct manner, to the remote server 110 the user authentication ticket.

The local server 48 may thus use the user authentication ticket to further exchange with the remote server 110. The local server 48 can use the user authentication ticket to encrypt data to be transferred to the remote server 110.

Eventually, only the remote server 110 that is paired is effectively allowed to discuss with the local server 48 that may access to the local resources and data.

Figure 7:
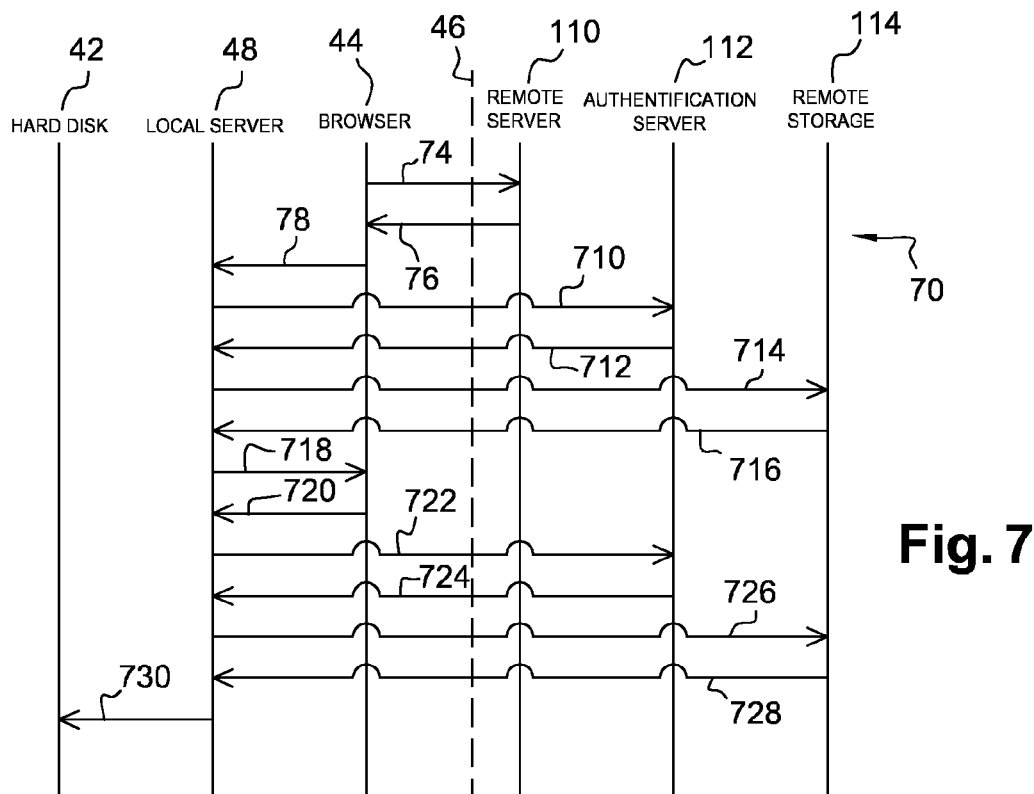
FIG. 7 depicts a fourth embodiment of a message flow involving the local server, the remote server, an authentication server, a remote data storage area, for locally restoring data that is remotely stored, as different entities implementing the method of FIG. 3.

FIG. 7 shows messages involving the local server 48, the remote server 110, an authentication server 112, a remote data storage area 114, and the hard disk 42 for locally restoring data that remotely is stored.

According to another embodiment (not represented), the remote server, the authentication server and the remote data storage area constitute a single server.

These different entities exchange 70 data for a transfer of one or several selected (data) files stored within a memory that is remotely accessible, as remote resource, to a memory of the PC, namely the hard disk 42, as local data storage area.

It is assumed herein under that the local server has previously been provided with a user authentication key, as a user authentication ticket, as a first user authentication level.

Firstly, the browser 44 sends to the remote server 110 a request 74, such as HTTP GET, for obtaining a home page stored within the remote server 110.

The remote server 110 receives the request 74 and sends, to the browser 44, a response 76 encompassing a command for involving a local server 48 accompanied by credentials pertaining to the remote server.

The command for involving the local server 48, such as "portail.html", is a script that is executable by the browser 44. Such executable data requires the browser 44 to involve the local server 48 to authenticate itself by providing the authentication server 112 with the user authentication ticket, as local server credentials.

The remote server credentials are constituted by a first secret data that has been encrypted with a private remote server key and an encrypting algorithm stored within (or accessible by) the remote server 110.

The first secret data and the corresponding public remote server key and decrypting algorithm are stored within (or accessible by) the local server 48.

The browser 44 extracts from the encrypted data, the command for involving a local server 48.

The PC user requests, through the browser 44, by using the man machine interface, a list of data files that are remotely stored, i.e. within a remote data storage area 114.

The browser 44 then addresses a request 78, such as an HTTP GET, to the local server identified within the command while transmitting it the encrypted data, as remote server credentials, originating from the remote server 110.

The local server 48 checks whether the sender identifier is known to it, and preferably whether the remote server credentials are known to it. The local server 48 decrypts the encrypted data received through the browser 44 by using a public remote server key and a decrypting algorithm stored within the local server 48.

When applicable, i.e. when the remote server 110 is identified and the received remote server credentials are the ones stored, namely the ones that allow to retrieve the first secret data by using the corresponding public remote server key and decrypting algorithm, then the local server 48 has authenticated the remote server.

The local server 48 sends to the authentication server 112 a message 710 for requesting credentials relating to a local server, as local server credentials. This message 710 includes a request for accessing the list of data files stored within the remote data storage area 114 and the user authentication ticket.

The authentication server 112 verifies whether the received data matches with the user authentication ticket.

When the comparison between the received data and the user authentication ticket is negative, the authentication server 112 does not authenticate the local server and forbids any further communication with the local server 48.

When the comparison between the received data and the user authentication ticket is positive, the authentication server 112 authenticates the local server 48.

In such a latter case, the authentication server 112 sends to the local server 48 a message 712 comprising an operation authentication key, as an operation authentication ticket, in order that the user be allowed to perform any operation with respect to the remote data storage area 114.

Once received, the local server 48 uses the operation authentication ticket, as a second user authentication level, for encrypting any message to be addressed to the remote storage area 114.

The authentication server 112 can revoke the operation authentication ticket possibly by sending a message to the local server for informing it about a revocation relating to the current operation authentication ticket or transmitting another operation authentication ticket.

The local server 48 sends to the remote data storage area 114 a message 714 for requesting to be provided with the file list stored within it.

After having authenticated the local server 48, the remote data storage area 114 sends to the local server 48, as a response, a message 716 including the available file list.

Once this message 716 has been received, the local server 48 sends to the browser 44 the file list that is accessible from the remote data storage area 114.

The PC user selects, among the file list, through the browser 44, a file that she or he desires to store locally, by executing a corresponding operation.

Then, the browser 44 interprets the operation and requests to select the desired file by sending to the local server a message 720 for requesting to transfer the selected file.

The local server 48 receives this message 720 with the file to be selected. Then, the local server 48 transmits to the authentication server 112 a message 722 for requesting to transfer from the remote data storage area 114 to the local server 48 the selected file and the operation authentication ticket, as local server credentials.

The authentication server 112 verifies whether the data received from the local server 48 matches with the operation authentication ticket.

When the comparison between the received data and the operation authentication ticket is negative, the authentication server 112 does not authenticate the local server and forbids any further communication with the local server 48.

When the comparison between the received data and the operation authentication ticket is positive, the authentication server 112 authenticates the local server 48.

In such a latter case, the authentication server 112 sends to the local server 48 a message 724 comprising another operation authentication key, as an operation authentication ticket, in order that the user be allowed to perform any operation with respect to the remote data storage area 72.

Once received, the local server 48 uses the other operation authentication ticket, as a third user authentication level, for encrypting any message to be addressed to the remote storage area 72.

The local server 48 sends to the remote data storage area 114 a message 726 for requesting to be provided with the selected file stored within the remote data storage area 72.

After having authenticated the local server 48, the remote data storage area 114 sends to the local server 48, as a response, a message 728 including the available selected file.

Once this message 728 has been received, the local server 48 sends to the hard disk 42 a message 730 containing the selected file (that has been supplied by the remote data storage area 72).

Finally, the hard disk 42 receives the selected file to be written, in order to copy the selected file that is remotely stored.

The invention claimed is:

1. A method for managing an access from a remote device to data and/or at least one resource accessible from a local device and the remote device, wherein the local device includes a browser, and the remote device includes a remote server, the method comprising:
   a remote server connecting step in which the browser sends to the remote server a request for loading data,
   a local server interconnecting step in which the remote server sends a page to the browser, the page including executable data and a graphic interface, such that execution of the executable data by the browser causes the browser to send to a local server a request for connecting to the local server, as a response to the request for loading data; and wherein the browser, as a single user interface, displays the graphic interface, the graphic interface aggregating data originating from at least one remote data storage area and data originating from at least one local data storage area.

2. The method according to claim 1, further comprising a local server connecting step in which the local server sends data to the remote server, the local server being connected from the remote server to data storing means and/or at least one resource accessible from the local device.

3. The method according to claim 1, further comprising a remote connecting step in which a remote data storage area sends, upon a user selection through the browser, data to the local server, the remote data storage area being connected, through the local server, to data storing means and/or at least one resource accessible from the local device.

4. The method according to claim 1, wherein the method further comprises a remote server authentication step wherein, during the local server interconnecting step, the remote server sends, through the browser, to the local server, a request for connecting to the local server accompanied with data relating to first credentials, as a response to the request for loading data, and the local server compares data relating to the first credentials with first expected authentication data and, according to a comparison result, the local server authorizes or forbids the remote server to further exchange data with the local server.

5. The method according to claim 1, wherein the browser presents, through the local server, at least one item of information relating to, on one hand, data stored within the remote device and/or within at least one other device connected to the remote device and, on the other hand:

data stored within the local device;
data stored within at least one other device connected to the local device; and/or
data relating to at least one resource accessible from the local device.

6. The method according to claim 1, wherein the method comprises a user authentication step, the user authentication step comprising a step in which the local server sends data relating to second credentials to the remote server and/or an authentication server, the remote server and/or the authentication server compares data relating to the second credentials to second expected authentication data, and, according to a comparison result, the remote server and/or the authentication server forbids or authorizes the local server to continue while transmitting third credentials to the local server to be used for further communicating from the local server to the authentication server and/or the remote server.

7. The method according to claim 6, wherein the method comprises a local server authentication step, wherein the remote server and/or the authentication server receives from the local server data relating to the third credentials, the remote server and/or the authentication server compares data relating to the third credentials to third expected authentication data, and, according to a comparison result, the remote server and/or the authentication server forbids or authorizes the local server to continue while transmitting fourth credentials to the local server to be used for further communicating from the local server to the authentication server and/or the remote server.

8. The method according to claim 7, wherein a token is connected to the local device, the token being able to generate data relating to the second credentials and/or store data relating to the second credentials to be sent by the local server to the remote server and/or the authentication server.

9. The method according to claim 6, wherein a user enters data, as second credentials, by using a man machine interface included within or connected to the local device, and wherein the local server sends the second credentials to the remote server and/or the authentication server.

10. The method according to claim 8, wherein the remote server and/or the authentication server are able to generate the data relating to the second, the third and/or the fourth credentials, and/or store data relating to the second, the third and/or the fourth credentials to be sent by the remote server and/or the authentication server to the local server and/or store the second, the third and/or the fourth expected authentication data.

11. The method according to claim 1, wherein the local server sends to the remote device, and/or another remote data storage means connected to the remote device, data stored within the local device and/or within a resource connected to the local device and/or a token connected to the local device.

12. A system for managing an access to data and/or at least one resource accessible from a local device and a remote device, the system comprising:

a local device, and a remote device connected to the local device, wherein:
the remote device includes a remote server;
the local device includes a browser and a local server, the browser being configured to send to the remote server a request for loading data; and
the remote server is configured to send a page to the browser, the page including executable data and a graphic interface, such that execution of the executable data by the browser causes the browser to send to the local server a request for connecting to the local server, as a response to the request for loading data, wherein
the browser, as a single user interface, displays the graphic interface, the graphic interface aggregating data originating from at least one remote data storage area and data originating from at least one local data storage area.

13. The system according to claim 12, wherein the local server is configured to send data to the remote server, the local server being configured to be connected from the remote server to at least one memory and/or at least one resource accessible from the local device.

14. The system according to claim 12, wherein a remote data storage area sends, upon a user selection through the browser, data to the local server, the remote data storage area being connected, through the local server, to at least one memory and/or at least one resource accessible from the local device.

* * * * *